United States Patent [19]

Scibbe

[11] 4,431,091
[45] Feb. 14, 1984

[54] VEHICLE BRAKE SYSTEM
[75] Inventor: Harold R. Scibbe, Chardon, Ohio
[73] Assignee: Euclid, Inc., Cleveland, Ohio
[21] Appl. No.: 337,699
[22] Filed: Jan. 7, 1982
[51] Int. Cl.³ .................... F16D 65/78; F16D 25/06
[52] U.S. Cl. .......................... 188/264 F; 188/264 D;
188/352; 192/85 AA
[58] Field of Search ............. 188/264 F, 264 D, 352,
188/366, 71.6, 72.4; 192/85 AA; 137/238

[56] References Cited
U.S. PATENT DOCUMENTS

| | | | |
|---|---|---|---|
| 2,195,214 | 3/1940 | Jacob | 303/84 A |
| 2,502,547 | 4/1950 | Adams et al. | 91/415 X |
| 2,519,900 | 8/1950 | Geiger et al. | 91/519 X |
| 2,527,290 | 10/1950 | Anderson . | |
| 2,544,476 | 3/1951 | Venning . | |
| 2,683,966 | 7/1954 | Tyler | 91/415 X |
| 2,700,303 | 1/1955 | Galliers . | |
| 2,729,228 | 1/1956 | Stevenson . | |
| 2,823,770 | 2/1958 | Helvern . | |
| 2,862,513 | 12/1958 | Mecier et al. . | |
| 2,892,614 | 6/1959 | Majneri . | |
| 2,902,044 | 9/1959 | Sherer et al. | 137/199 |
| 2,928,504 | 3/1960 | Hahn et al. . | |
| 2,968,372 | 1/1961 | Kern | 188/352 |
| 3,050,080 | 8/1962 | Pagano . | |
| 3,081,788 | 3/1963 | Lewis . | |
| 3,105,582 | 10/1963 | Ziabicki . | |
| 3,198,295 | 8/1965 | Fangman et al. . | |
| 3,202,253 | 8/1965 | Merritt et al. . | |
| 3,217,851 | 11/1965 | Mogk et al. . | |
| 3,282,385 | 11/1966 | Synder | 192/85 AA |
| 3,559,405 | 2/1971 | Neilson . | |
| 3,580,368 | 5/1971 | Heck . | |
| 3,690,429 | 9/1972 | Honda . | |
| 3,724,609 | 4/1973 | Kobald | 188/106 P |
| 3,732,890 | 5/1973 | Smith . | |
| 3,760,912 | 9/1973 | Braun | 188/151 A |
| 3,927,737 | 12/1975 | Prillinger et al. . | |
| 3,941,219 | 3/1976 | Myers . | |
| 3,946,837 | 3/1976 | Houser . | |
| 4,077,500 | 3/1978 | Hickman, Sr. et al. | 188/366 |
| 4,207,969 | 6/1980 | Howell | 188/106 P |

FOREIGN PATENT DOCUMENTS 451918 11/1927 Fed. Rep. of Germany ........ 192/86
534401 3/1941 United Kingdom .................. 91/519

Primary Examiner—Bruce H. Stoner, Jr.
Assistant Examiner—Robert J. Oberleitner
Attorney, Agent, or Firm—Watts, Hoffmann, Fisher & Heinke Co.

[57] ABSTRACT

An automatic purge valve 110 for removing air and/or vapor from a fluid pressure operated brake system. The valve comprises a chamber 120 disposed in a brake assembly that includes a pair of opposed coaxially aligned valve seats 120b, 134b and a valve member 130 disposed in the chamber and engagable with either of the seats. The seat 134b communicates with a brake coolant system 58; the other valve seat 120b communicates with a piston retraction fluid chamber 90. The valve member is biased towards the one valve seat 120b by pressure in the coolant system and is driven toward the other valve seat 134b during brake actuation by fluid pressure in the piston retraction fluid chamber. Air and/or vapor is discharged from the retraction fluid circuit into the coolant circuit as the valve member travels from the seat 120b to the seat 134b each time the brake assembly is actuated.

12 Claims, 3 Drawing Figures

VEHICLE BRAKE SYSTEM

DESCRIPTION

Technical Field

The present invention relates generally to vehicle brake systems and in particular to an apparatus and method for automatically purging gas and vapor from a fluid pressure operated brake system.

Background Art

Modern vehicle brake systems are typically fluid pressure operated and include at least one brake assembly operatively connected to a vehicle wheel. The assembly is actuated by pressurized fluid generally conveyed to it by a system of conduits that extend between the brake assembly and an operator control. The mechanism for energizing the brake assembly to effect "braking" usually comprises a fluid pressure operated piston and associated piston housing, operatively connected to a friction member.

The pressurized brake operating fluid can be either a compressible fluid such as air or a substantially non-compressible fluid such as hydraulic oil. Hybrid brake systems, such as "air-over-oil" systems are also available, which employ both non-compressible and compressible fluids in operation.

In those systems which utilize a non-compressible fluid for transmitting operating pressure between the operator control and the brake actuating mechanism, the entry of gas or vapor into the fluid path should be avoided, for in many hydraulic type brake systems, the presence of air can produce erratic brake operation. Most hydraulic brake systems therefore, include devices for "bleeding" entrapped air from the system. Generally these devices comprise manually operated valve members which are opened to communicate a conduit or the piston housing with the outside. When the device is opened, air and fluid in the vicinity of the device is discharged.

In hydraulic systems, other than brake systems, automatic purge valves for automatically discharging air or vapor from the system have been suggested by the prior art. These proposed devices are generally considered unsuitable in brake system applications due to their size and/or unreliability. It must be remembered, that should the purge valve discharge an excessive amount of operating fluid, the hydraulic system can be rendered partially or completely inoperative.

A new and improved vehicle brake system is disclosed in co-pending patent application Ser. No. 148,538, which is also owned by the present assignee. The brake system disclosed in this co-pending application, comprises a liquid cooled, multi-disc brake assembly including a disc pack actuated by a multi-stepped annular piston slidably mounted within a piston housing. The piston defines three, non-communicating effective pressure areas associated with respective fluid chambers that receive fluid from three non-communicating conduits. The application of pressure to two of the areas generates a brake apply force urging the piston into engagement with the disc pack whereas the application of pressure to the third pressure effective area generates a retraction force urging the piston away from the disc pack. In the embodiment illustrated by the '538 application, the piston is configured so that the simultaneous application of equal fluid pressures to the actuating piston produces a net application force that urges the piston into engagement with the disc pack. The brake is released by depleting the pressure to the brake-apply effective pressure areas while maintaining, temporarily, the pressure on the retraction effective pressure area thus urging the piston away from the disc pack.

Although the brake system disclosed by this earlier filed application performs satisfactorily, it has been found desirable to provide a means for "bleeding" air from the fluid circuit to enhance its operation. It was found that air, occassionally trapped in the brake assembly would produce minor braking irregularities. Specifically, air trapped in the retraction circuit would result in insufficient piston retraction thus creating a brake "drag" condition in which the disc pack was not fully released. It is desirable to avoid brake drag to prevent excess wear and attendant maintenance cost.

DISCLOSURE OF THE INVENTION

The present invention provides a new and improved apparatus for automatically bleeding air and vapor from a brake system that employs a non-compressible fluid as the medium for transmitting force between a brake operator control and a brake actuating member. The illustrated embodiment is especially suited for use in the vehicle brake system disclosed in patent application Ser. No. 148,538 which is hereby incorporated by reference.

In the preferred and illustrated embodiment, the brake system includes a brake assembly having disc pack operatively connected to at least one ground engaging wheel. An annular piston slidably mounted within a piston housing forming part of the brake assembly is movable towards and away from the disc pack to effect brake application and release. Movement in the piston is effected by the communication of pressurized fluid to the piston housing in response to actuation of an operator control.

The brake system also includes a cooling circuit that circulates liquid coolant through a coolant chamber defined in the brake assembly, which houses the disc pack. The coolant removes heat from the brake assembly, generated by the discs during braking. According to the invention, the brake system includes a purge valve, one preferably mounted within each brake assembly, that automatically discharges air and/or vapor in the piston operating fluid pressure system into the brake cooling system. In the preferred embodiment, the purge valve operates to discharge any accumulated air or vapor in the piston operating circuit into the brake cooling circuit each time the brake is actuated, thereby eliminating any air or vapor trapped in the piston housing.

In the preferred construction, the purging device comprises structure disposed in each brake assembly that defines a pair of spaced valve seats, preferably located in coaxial alignment. One valve seat communicates with the piston operating fluid circuit, whereas the other valve seat communicates with the brake cooling circuit. A valve member is movably disposed between the valve seats and is sealingly engageable with the seats. In operation, the valve member is biased towards the one valve seat by pressure in the coolant circuit and biased towards the other valve seat by pressure in the piston actuation circuit. When the brake is released, the coolant pressure drives the valve member into engagement with the one valve seat thereby preventing the discharge of coolant fluid into the piston actuation circuit. Whenever the brake is actuated, the pressure of the actuating fluid unseats the valve member and drives it towards the other valve seat. In travelling from the one valve seat to the other valve seat, fluid in the vicinity of the one valve seat, is transferred from the piston actuation circuit to the brake cooling circuit until the valve member engages the other valve seat, whereupon further fluid transfer is prevented. Gas and/or vapor in the piston actuation circuit will normally collect at a high point in the flow path. By communicating the one valve seat with this high point, any gas or vapor collected will be transferred to the brake coolant circuit as the valve member travels from the one valve seat to the other valve seat upon brake actuation.

The present apparatus provides a very effective method for preventing the accumulation of air or vapor in a brake actuating circuit and is especially effective in a brake system that includes a brake coolant circuit. The disclosed purge valve, although extremely effective is relatively simple to manufacture. It does not require the plurality of valving elements and mechanical biasing devices, such as springs, suggested by prior art purge valves. In the present invention, coolant pressure provides the necessary biasing for the single valve member.

In the preferred and illustrated embodiment, the present invention forms part of the brake assembly disclosed in application Ser. No. 148,538. The actuating piston comprises a multi-stepped annulus that defines three effective pressure areas communicating with three non-communicating fluid pressure chambers. The application of pressurized fluid to two of the areas generates a brake application force that urges the piston into engagement with the disc pack whereas the application of pressure to the third effective pressure area generates a retraction force urging the piston away from the disc pack.

According to the preferred embodiment of the invention, the one valve seat of the purge valve communicates with the retraction fluid chamber through a passage formed in the brake housing. The other valve seat communicates with the coolant chamber (in which the disc pack is disposed) through another passage formed in the brake housing. In the preferred operation, brake actuation is achieved by the simultaneous pressurization of all three fluid pressure chambers which results in a net brake actuation force. During brake actuation, the pressurization of the retraction fluid chamber overcomes the coolant generated biasing force and drives the valve member from the one valve seat to the other valve seat thereby discharging any gas or vapor in the retraction fluid chamber into the coolant chamber. Those skilled in the art will recognize that the presence of minor amounts of air or other gasses in the coolant circuit is of less or little consequence because minor changes in the compressibility of the cooling liquid will not significantly change the heat transfer rate in the brake assembly. When the brake is released, the retraction pressure is eventually extinguished allowing the coolant pressure to drive the valve member from the other valve seat to the first valve seat where it remains until the brake is again actuated.

The present invention provides a relatively simple device for automatically purging gas and vapor from the piston actuation circuit of the brake assembly disclosed in Ser. No. 148,538. Although the device operates between the retraction chamber and the coolant circuit, it has been found that the accumulation of air throughout the brake actuation fluid circuit, i.e., the brake application chambers, is also minimized. It has been found that with the present invention, brake application and brake release can be controlled more precisely and predictably.

In the preferred and illustrated embodiment, the brake housing is formed by an inboard cover that also serves as a mounting plate for the brake assembly, an outboard cover plate, and a ring member disposed and sealingly clamped, between the inboard and outboard covers. In the preferred construction, the ring housing defines an annular distribution channel that communicates with a coolant supply conduit suitably connected to the brake assembly. The piston is slidably supported in a recess defined between the ring member and the inboard cover. Seals mounted in the housing and cover sealingly engage the piston and isolate the brake application and retraction chambers from each other and from the rest of the brake assembly.

According to a feature of the invention, the purge valve is located in the brake housing and is formed by a relatively short bore, including a threaded portion machined into the brake housing. A tapered valve seat including a central aperture is formed at one end of the bore. The aperture of the valve seat is connected to the one passage that extends into fluid communication with the retraction chamber. A ball is captured in the bore by a retainer threadedly received by the threaded bore portion, which also defines the second seat of the purge valve. The second seat communicates with the other passage formed in the brake housing that extends into fluid communication with the coolant distribution channel. The ball is engageable with either the first seat defined at the one end of the bore or the second seat defined by the retainer. Coolant pressure communicated through the retainer biases the ball towards the first seat, whereas pressure in the retraction chamber biases the ball towards engagement with the second seat defined by the retainer.

According to this feature of the invention, the bore and associated passages are machined into the ring housing member. Assembly of, and access to, the purge valve is obtained through a short radial bore that extends from the outer circumferential surface of the ring housing in co-axial alignment with the purge valve bore, and which is sealed by a suitable plug after assembly of, or service to, the purge valve.

Although the embodiment illustrated is specifically adapted to operate in the brake assembly disclosed in the above noted application, it will be recognized, that the principles of the invention are applicable to other fluid pressure operated braking systems that include a fluid actuation system and a secondary fluid circuit, such as a coolant circuit. The secondary fluid circuit would be used to bias the valve member towards the one valve seat. Moreover it is believed that the present invention can be adapted to operate between a brake applying fluid chamber and the brake coolant circuit for those brake systems not equipped with fluid retraction chambers.

Additional features and a fuller understanding of the present invention will be obtained in reading the following detailed description made in connection with the accompanying drawings.

BEST MODE FOR CARRYING OUT THE INVENTION

Figure 1:
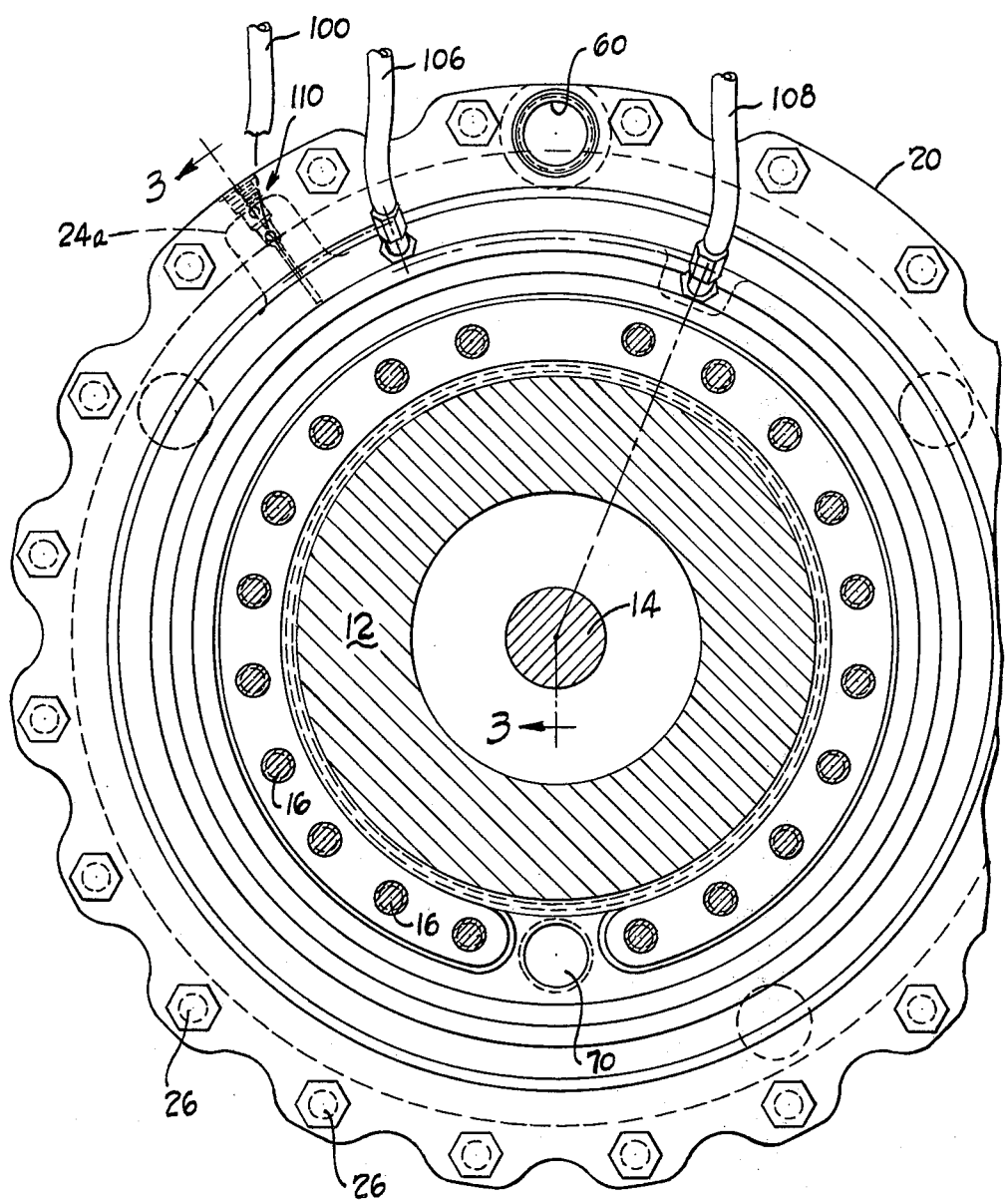
FIG. 1 is a cross-sectional view of a portion of a brake system constructed in accordance with the present invention with cooling system apparatus shown schematically and with certain fluid connections omitted for clarity.

A multi-disc brake assembly 10, incorporating the present invention, is illustrated in FIG. 1. The brake assembly 10 encircles a conventional axle housing 12 that rotatably mounts a drive axle 14 suitably connected to a driven wheel (not shown) either directly or through a planetary gear system (also not shown). The assembly 10 is fixed to the housing 12 by a plurality of bolts 16 which extend through a flange 18, integrally formed with the axle housing 12, and threadedly engage the brake assembly.

Figure 3:
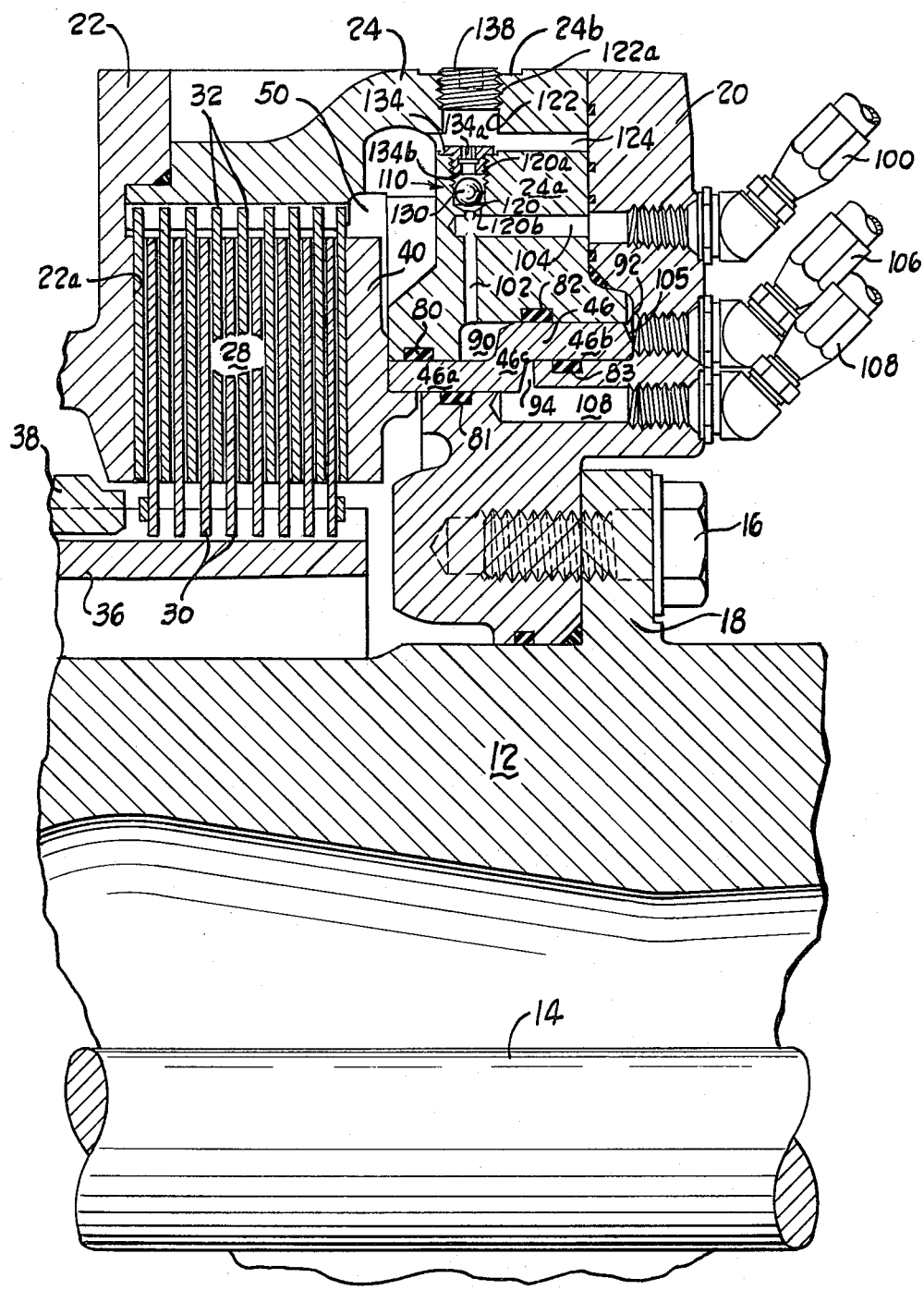

As fully described in co-pending application Ser. No. 148,538, which has been expressly incorporated by reference, the brake assembly 10 includes a brake housing defined by an outboard brake housing cover 22, a ring housing 24 and an inboard housing cover 20 clamped together by a plurality of circumferentially disposed bolts 26. The assembled brake housing encloses a disc pack 28 that comprises a plurality of interleaved rotatable and non-rotatable friction plates 30, 32. Referring also to FIG. 3, the rotatable discs 30 slidingly engage a splined carrier 36 which is operatively connected to a drive wheel by a splined hub adapter 38 (only a portion of the hub adapter is shown) so that rotation of the wheel imparts rotation of the discs 30. The non-rotatable discs are in turn, splined to the ring housing 24. Frictional engagement between the discs 30, 32 to arrest wheel rotation is achieved by an annular, axially movable pressure plate 40, which when moved towards the left (as viewed in FIG. 1), compresses the disc pack between the pressure plate 40 and an end wall 22a of the outboard brake housing member. The pressure plate 40 is driven towards the disc pack by an annular, unitary piston 46 that includes first and second cylindrical portions 46a, 46b joined together by an intermediate portion 46c (shown in FIG. 3).

As seen in FIG. 1, a brake cooling system 58, indicated schematically, is employed to remove heat generated during braking, from the brake assembly 10 the disc pack 28 and the pressure plate 40 are disposed in a coolant chamber 50 defined internally by the brake housing members 20, 22, 24. Preferably, the brake housing includes an outlet port 60 formed in the inboard brake housing cover 20 that communicates with a laterally extending passage 62. The passage 62 in turn communicates with an annular collection channel in the form of a recess 64 which is defined by the ring housing 24. Coolant from the brake cooling system 58 is introduced into the brake assembly 10 through an inlet port 70. The inflow of coolant is distributed throughout the coolant chamber 50 and travels around and between the discs 30, 32 finally exiting the brake assembly 10 through the outlet port 60. Annular face seals 72 prevent fluid leakage out of the brake housing 10.

Figure 2:
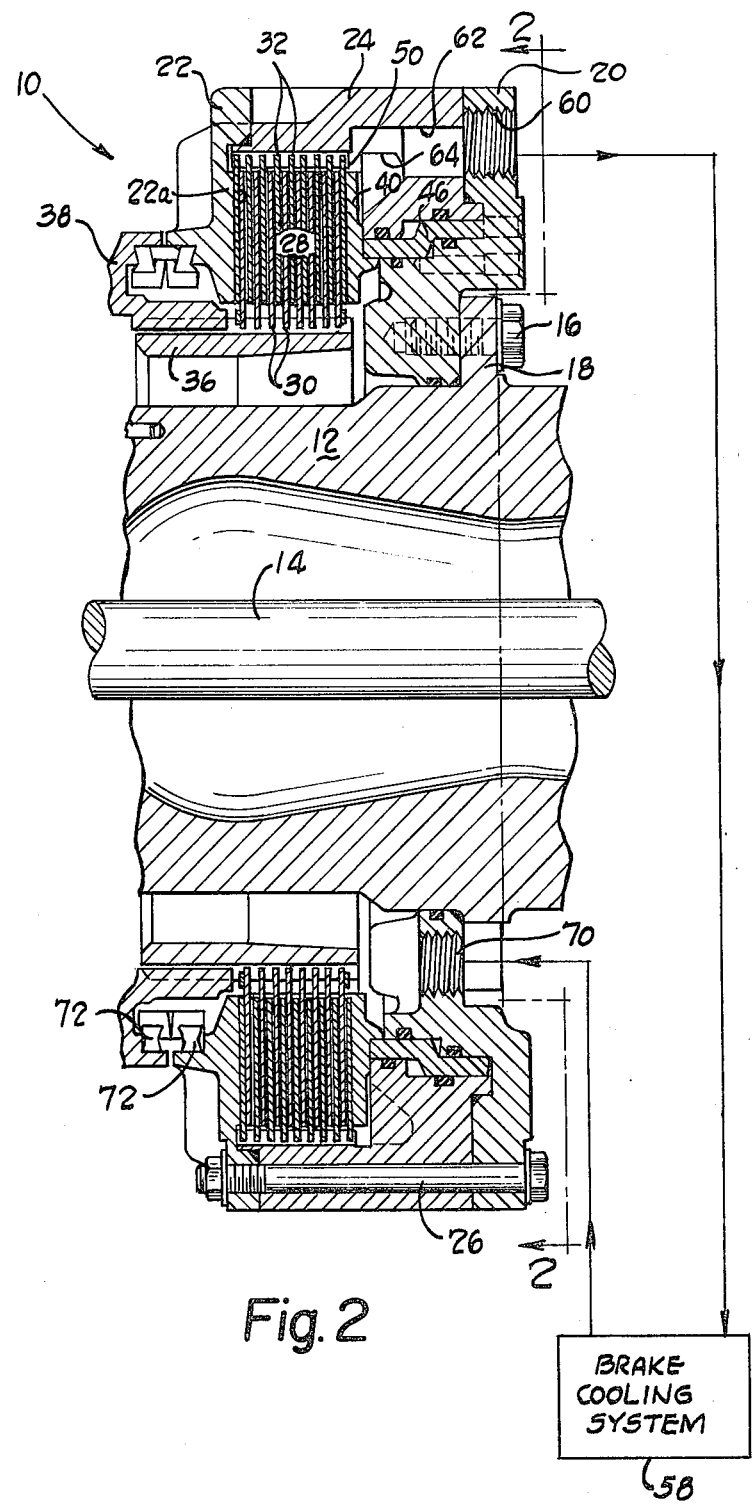
FIG. 2 is an end view of a brake system portion as seen from the plane indicated by the line 2—2 in FIG. 1, and, FIG. 3 is a fragmentary, sectional view as seen from the plane indicated by the line 3—3 in FIG. 2.

Turning now to FIGS. 2 and 3, the piston 46 is driven towards and away from the pressure plate 40 by pressurized fluid conveyed to fluid chambers in communication with effective pressure areas defined by the piston. As seen most clearly in FIGS. 1 and 3, the piston 46 is slidably mounted between portions of the ring housing 24 and inboard brake housing cover 20. Annular seals 80–83 sealingly engage the piston 46 and together with the housing members 24, 20 define a piston retraction fluid chamber 90 and two brake applying chambers 92, 94. The retraction chamber 90 communicates with a supply conduit 100, threadedly received by the inboard housing cover 20, by way of drilled passages 102, 104 disposed in the ring housing 24. The seals 80, 82 prevent fluid leakage out of the chamber 90. The brake applying chamber 92 communicates with an outer end wall 105 of the piston and receives pressurized fluid from a supply conduit 106 also threadedly received by the brake housing cover 20. The chamber 94 receives fluid pressure from a supply conduit 108, threadedly connected to the housing member 20, by means of a drill passage 108. The chambers 90, 92 and 94 are preferably annular and are defined by annular recesses suitably machined into the inboard housing cover 20 and the ring housing 24. It will be recognized that the communication of pressurized fluid to the chamber 90 will urge the piston towards the right, as viewed in FIG. 3 whereas the communication of pressurized fluid to the chambers 92, 94 will urge the piston in a brake apply direction i.e., towards the left as viewed in FIG. 2.

As fully disclosed in co-pending application Ser. No. 148,538, brake actuation is preferably obtained by concurrently supplying pressurized fluid to all three fluid chambers 90, 92, 94. In the preferred construction, the total piston area exposed to fluid in the chambers 92, 94 is greater than the area exposed to fluid in the chamber 90 and therefore the concurrent application of substantially equal fluid pressures to all three chambers will produce a net brake application force, driving the piston 46 towards the left (as viewed in FIG. 3) thereby engaging the disc pack to effect braking.

Brake release is obtained by terminating the application of pressurized fluid to the fluid chambers and restricting the return flow of fluid from the retract chamber 90 in order to maintain retraction pressure until the pressure in the brake applying chambers 92, 94 has been substantially reduced. This temporary pressure retention in the retraction chamber, drives the piston 46 towards the right, thereby ensuring complete release of the disc pack.

Referring to FIGS. 2 and 3, the accumulation of air and/or vapor in the piston actuating fluid circuits is minimized by a urge valve, indicated generally by the reference character 110, that operates between the retraction fluid circuit and the cooling fluid circuit. The ring housing 24 includes an integrally formed rib or web portion 24a that interrupts the annular distribution channel 64. The retraction passage 104, referenced earlier, is drilled into the webbed portion 24a and as best seen in FIG. 3, does not continue through the web and is therefore isolated from the coolant chamber 50. The passage 102 is drilled from an outside circumferential surface 24b of the ring housing member 24 and is preferably directed radially, extending through the passage 104, near the left end (as viewed in FIG. 3) and into fluid communication with the retraction chamber 90. A purge valve chamber is then formed in the web 24a by machining a bore 120 in coaxial alignment with the retraction chamber passage 102 through a central aperture. The bore 120 is formed with an upper threaded portion 120a and terminates in a conical seat 120b that communicates with the passage 102. An access bore 122 including a threaded portion 122a is machined in coaxial alignment with the purge valve bore 120. A lateral through-bore 124 extends through the access bore 122 and communiates the chamber bore 120 with the brake coolant chamber.

The purge valve assembly comprises a valve member 130, preferably a ball, disposed in the chamber bore 120 and captured there by a retainer 134 threadedly received by the threaded portion 120a of the bore 120. The retainer 134 defines a central passage 134a and a valve seat 134b engageable by the ball 130. The passage 134a may be formed with a hex-shaped portion to facilitate installation and tightening. The retainer 134 is installed in the chamber bore 120 through the access bore 122. Once assembled, the access bore 122 is sealed by a threaded plug 138.

The ball 130 controls the fluid communication between the retraction circuit and the coolant circuit. As viewed in FIG. 3, when the ball engages the lower seat 120b, fluid flow from the coolant chamber (via the passages 124, 134a) is prevented. When the ball engages the upper seat 134b, fluid flow from the retraction circuit (via passages 102 or 104) is prevented.

According to the invention, air and vapor are purged from the retraction circuit whenever the brake is actuated. In the preferred operation, all three fluid chambers 90, 92 and 94 are normally depressurized between brake applications. In the absence of pressurization of the retraction chamber 90, the coolant circuit pressure, as sensed through the passages 124 and 134b, urge the ball 130 into engagement with the lower, conical seat 120b, thus preventing coolant flow into the retraction circuit. During brake actuation, all three pressure chambers 90, 92, and 94 are pressurized to effect engagement of the disc pack. Upon pressurization of the retraction chamber 90, (via the passages 104, 102) the retraction pressure exerted on the ball 130 overcomes the coolant pressure bias and drives the ball upwardly into engagement with the upper valve seat 134b, preventing fluid flow from the retraction circuit into the coolant circuit. As the ball 130 travels from the lower seat 120b to the upper seat 134b, a small amount of air, vapor and possibly fluid escapes from the retraction circuit into the coolant circuit by way of the open valve seats 120b, 134b which are both unsealed when the ball 130 is between the seats (as shown in FIG. 3). It should be apparent, that the ball travels from the lower to the upper seat whenever the brake assembly is actuated due to the pressurization of the retraction chamber 90. Thus, with the present invention, the actuation system is continually bled of air and vapor.

In the preferred embodiment, a small amount of fluid from the brake retraction circuit may be discharged through the purge valve, each time the brake is actuated. This minute amount of fluid is considered an insignificant loss, and more importantly, any fluid discharged is not lost from the vehicle, but only transferred to another fluid circuit, i.e., the coolant system, where, if necessary, it can be recovered.

The disclosed automatic purging apparatus has been described in connection with a brake system that includes two brake application fluid circuits and a retraction circuit for applying and releasing a brake assembly respectively. For this particular brake system, it has been found advantageous to locate the purge valve so that it operates between the retraction circuit and the coolant circuit. The invention, however, is not limited to this type of brake system. It is adaptable to virtually any fluid pressure operated brake system that includes at least one piston actuating fluid circuit and a secondary fluid circuit, such as a coolant or power steering circuit, between which, the disclosed purge valve can operate. All that is required, is a source of biasing pressure from a secondary fluid circuit, to urge the valve member 130 into engagement with the seat 120b, when the brake is deenergized. In alternate brake system applications, the disclosed purge valve would operate in the manner discribed above in that, the valve member 130 would be driven into engagement with the upper valve seat 134b whenever the brake is actuated. As described above, air and/or vapor and possibly a small amount of brake fluid would be discharged into the secondary fluid circuit as the valve member travels from the lower to the upper seat. Upon brake deenergization, the valve member would be driven downwardly by pressure in the secondary fluid circuit to prevent fluid transfer from the secondary circuit to the piston actuation circuit.

Although the invention has been described with a certain degree of particularity, it should be understood that those skilled in the art can make various changes to the invention without departing from the spirit or scope of the invention as hereinafter claimed.

I claim:

1. A brake system for a wheeled vehicle or the like, comprising:
   (a) a brake assembly operatively connected to a ground engaging wheel;
   (b) brake operating means including a fluid pressure operated piston for actuating said brake assembly to arrest rotation of said wheel;
   (c) brake assembly cooling means including fluid coolant for removing heat generated in said assembly;
   (d) purging means for discharging gas from said brake operating means including structure defining first and second valve seats and passage means communicating said first valve seat with said brake operating means and said second valve seat communicating with said brake cooling means;
   (e) said purging means further including a valve member engageable with one of said first and second valve seats, said valve member biased towards said first seat by fluid coolant in said brake cooling means and biased towards said second seat, during brake actuation, by brake actuating fluid in said brake operating means such that in the absence of brake actuation pressure said valve member sealingly engages said first seat to prevent fluid flow from said brake cooling means to said brake operating means and during brake actuation, said valve member travels to said second valve seat under the influence of the brake actuating fluid pressure thereby discharging gas from said brake operating means into said brake cooling means.

2. For a brake system having a fluid pressure operated brake assembly, and a secondary fluid pressure system operative to provide pressurized fluid during vehicle operation, an air purging apparatus, comprising:
   (a) structure defining a chamber including two valve seats;
   (b) passage means communicating one of said valve seats with a brake actuation fluid circuit;
   (c) other passage means communicating the other of said seats with said secondary fluid circuit;
   (d) a valve member disposed in said chamber and engageable with said valve seats, said member biased towards said one valve seat by fluid in said secondary fluid circuit and biased, during brake actuation, towards said other valve seat by fluid in said brake actuation circuit.

3. The apparatus of claim 2 wherein said valve member comprises a spherical element.

4. The apparatus of claim 2 wherein said valve seats are disposed in coaxial alignment.

5. The apparatus of claim 2 wherein said chamber is located in at least one brake assembly.

6. The apparatus of claim 2 wherein said secondary fluid circuit comprises a brake cooling system.

7. A brake system for a wheeled vehicle or the like, comprising:
 (a) a brake assembly operatively connected to a ground engaging wheel including friction members engagable to arrest rotation of said wheel;
 (b) brake operating means including a brake actuation fluid circuit for effecting engagement of said friction members;
 (c) apparatus for purging gas from said actuation circuit including:
  (i) structure defining a chamber and spaced valve seats communicating with said chamber;
  (ii) means communicating one of said valve seats with said brake actuation fluid circuit;
  (iii) valve member disposed in said chamber and engageable with either of said valve seats;
  (iv) fluid biasing means communicated through said other valve seat for urging said valve member into sealing engagement with said one valve seat, the force exerted by said fluid biasing means being less than the force applied to said valve member by said actuation circuit, when said brake is actuated such that said valve member is driven into sealing engagement with said other valve seat, when said brake is actuated.

8. The apparatus of claim 7 wherein said fluid biasing means is a brake coolant circuit.

9. A brake system for a wheeled vehicle or the like, comprising:
 (a) a brake assembly operatively connected to a ground engaging wheel;
 (b) said assembly including a disc pack having a plurality of interleaved non-rotatable and rotatable discs;
 (c) brake actuation means including a piston for engaging said disc pack to arrest rotation of said wheel;
 (d) brake assembly cooling means including a coolant chamber surrounding said disc pack and means for communicating fluid coolant to and from said coolant chamber;
 (e) purge valve means located in said brake assembly for discharging air from said brake actuation means, said purge valve means comprising:
  (i) structure defining spaced, opposed valve seats, passage means communicating one of said seats with said brake actuation means and another passage means communicating said valve seats with said brake cooling means;
  (ii) valve member disposed intermediate said valve seats;
  (iii) said valve member biased towards said one valve seat by pressure of said fluid coolant and biased towards said other valve seat by fluid pressure in said brake actuation means.

10. A brake assembly, comprising:
 (a) a plurality of interleaved, non-rotatable and rotatable discs;
 (b) a coolant chamber defined by said assembly and surrounding said discs including means for introducing and discharging fluid coolant;
 (c) brake actuating means including a fluid pressure operated piston for effecting frictional engagement of said discs;
 (d) said assembly further defining application chamber means communicating with portions of said piston and operative to apply fluid forces urging said piston in a brake applying direction, and further defining retraction chamber means communicating with other portions of said piston and operative to apply a retraction force to said piston urging said piston in a brake releasing direction;
 (e) purge valve means located in said brake assembly including a valve chamber defining spaced, valve seats, one of said seats communicating with said at least one of said chamber means and the other of said seats communicating with said coolant chamber;
 (f) a valve member disposed between and engageable with either of said valve seats, said valve member biased towards said one valve seat by fluid pressure in said coolant chamber and biased towards said other valve seat by pressure in said chamber means.

11. A brake assembly of claim 10 wherein said other valve seat communicates with said retraction chamber means.

12. The brake assembly of claim 10 wherein said valve member is spherical and said valve seats are disposed in coaxial alignment.

* * * * *